(12) United States Patent
Alur et al.

(10) Patent No.: US 6,516,306 B1
(45) Date of Patent: Feb. 4, 2003

(54) MODEL CHECKING OF MESSAGE FLOW DIAGRAMS

(75) Inventors: Rajeev Alur, Ardmore, PA (US); Mihalis Yannakakis, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/375,657

(22) Filed: Aug. 17, 1999

(51) Int. Cl.$^7$ ................................................. G06E 1/00
(52) U.S. Cl. ................................ 706/10; 703/2; 703/15
(58) Field of Search ............................. 706/10, 12, 48; 703/2, 15

(56) References Cited

U.S. PATENT DOCUMENTS

| | | | | |
|---|---|---|---|---|
| 5,812,145 A | * | 9/1998 | Holzmann et al. | 345/440 |
| 6,038,538 A | * | 3/2000 | Agrawal et al. | 705/7 |
| 6,185,516 B1 | * | 2/2001 | Hardin et al. | 703/14 |
| 6,259,451 B1 | * | 7/2001 | Tesler | 345/419 |
| 6,449,711 B1 | * | 9/2002 | Week | 712/201 |

OTHER PUBLICATIONS

J. Rekers; A graph based framework for the implementation of visual environments, 1996; IEEE 0–8186–7469–5/96; 148–155.*

Frank Slomka,; Schedulability Analysis of Hetrogeneous Systems for Performance Message Sequence Chart; 1998; IEEE 1092–6100/98; 91–95.*

A. V. Aho et al., The Design and Analysis of Computer Algorithms, Addison–Wesley, chapter 5, pp 172–223, 1974.

J. E. Hopcroft et al., Introduction to Automata Theory, Languages and Computation, Addison Wesley, pp 1–2,28, 58–59,130–131,230–231, 246, 266, 278, 280, 1979.

M. Y. Vardi et al., An Automata–Theoretic Approach to Automatic Program Verification. IEEE, pp 332–344, 1986.

R. P. Kurshan, Computer–Aided Verification of Coordinating Processes, Princeton Univ. Press, Chapter 8, pp 153–202, 1995.

R. Alur et al., Model Checking of Hierachical State Machines, Proc.Sixth ACM Symp. On Foundations of Software Engineering, pp 175–188 1998.

* cited by examiner

*Primary Examiner*—Thomas Black
*Assistant Examiner*—Joseph P. Hirl
(74) *Attorney, Agent, or Firm*—Hitt Gaines & Boisbrun P.C.

(57) ABSTRACT

Model checking for message sequence charts (MSCs), message sequence chart graphs and hierarchical message sequence chart graphs (HMSCs) is provided. To verify the behavior of a given MSC, MSC graph and HMSC, a specification automaton is constructed. This specification automaton specifies the undesirable executions of the model under analysis. From the model under analysis, linearizations are defined from the model and a finite test automaton is constructed from the linearizations. The test automaton and the specification automaton are combined and it is determined whether there is an execution in the intersection. Where no state in the specification automaton is reachable from the test automaton, the model is verified.

21 Claims, 8 Drawing Sheets

MODEL CHECKING OF MESSAGE FLOW DIAGRAMS

FIELD OF THE INVENTION

The invention relates generally to model checking in systems design and more particularly to model checking of message flow diagrams.

BACKGROUND

The design of complex software-related systems includes requirements engineering, model analysis, code construction and testing. The requirements engineers typically prepare a requirements document which describes the required or anticipated behavior of the new software in written prose. The requirements state the expected behavior of a system component in response to a particular sequence of external stimuli. The requirements document then serves as the input for constructing models that exhibit desired properties of the system. Software engineers use the models to build the code. The models may also serve as input in designing tests to test the code.

Model checking in systems design verifies that a model satisfies certain desired properties, such as the behavior of a communications switch or other component. If a model contains errors, the errors are transferred to the software engineers during coding and to the test engineers during test design. Any code or test case constructed from the model will likely exhibit the same errors as the model. These errors may not be discovered until acceptance testing, or worse, after the system is fully installed.

It is a disadvantage of traditional system design methods that textual requirements documents cannot be model checked. Since model construction and checking occurs later in the development cycle than the preparation of requirements documents, errors are also not revealed until later in the design of the system. These errors, if discovered during the requirements phase, can be corrected prior to model construction.

Message flow diagrams—also known as time sequence diagrams, message sequence charts (MSCs), or object interaction diagrams—are a popular formalism for documenting design requirements for concurrent systems, such as telecommunications software. MSCs are often used in the first attempts to formalize design requirements for a new system. In one form, MSCs depict the desired exchange of messages between processes in a system for one system execution or scenario. In another form, message sequence chart graphs (MSC-graphs) and hierarchical message sequence charts (HMSCs) can depict multiple scenarios of a given system or system feature. Since MSCs, MSC-graphs and HMSCs are often constructed at an early stage of design, any errors revealed in these formalisms benefits the remaining design effort.

Despite the many advantages in using message flow diagrams to document design requirements, there are few known methods for verifying that MSCs, MSC-graphs or HMSCs exhibit desired system behavior. One method requires translating MSC based specifications to communicating finite state machines and to analyze the resulting state machines to verify behavior. In this method, each process must be modeled as a state machine and then model checking is performed on the composition of the state machine. Analyzing communicating state machines, however, is computationally inefficient and results in a bottleneck during the model-checking phase of system design. Furthermore, the advantages of expressing design requirements as MSCs, MSC-graphs or HMSCs, such as the ability to view the parallel behavior of multiple processes, is compromised when they are converted to multiple state machines. The communicating state machines do not specify the exact same behaviors as the MSCs. The need remains, therefore, for a method system for model checking requirements specification such as MSCs.

SUMMARY

A system and method according to the principles of the invention provides for computationally efficient model checking of message flow diagrams such as message sequence charts (MSCs), MSC-graphs, and hierarchical message sequence charts (HMSCs). This permits behavior verification at an early stage of the development cycle. In an exemplary embodiment, verification is performed on an MSC. The MSC specifies a finite set of events where each event is labeled with a symbol from an alphabet of symbols. All possible linearizations of the partial ordering of events specified by the MSC are mapped over the symbols. These linearizations represent possible interleavings of events in the MSC. The resulting set of mappings, called strings, is referred to as the language of the MSC, and the strings represent the possible executions of the system.

A test automaton is then built to generate or recognize the language of the MSC. To build the test automaton, all the global states of the MSC are extracted. The initial state of the automaton is the state where no events have occurred. The final state of the automaton is the state where all events in the MSC have occurred. The intervening states are extracted by incrementing each process in the MSC by one event at a time over the MSC's possible linearizations. The test automaton then becomes a state machine over the language of the MSC.

To test this automaton, the undesired behavior of the system or system property is defined by a specification automaton that accepts or recognizes the undesirable executions of the system. The specification automaton is a state machine defined by a finite set of states, a set of initial states, an alphabet, a state transition relation, and a set of accepting states. The state transition relation defines the automaton's state transitions. The accepting states are defined as states which terminate a string recognized by the automaton; i.e., a string ending in an accepting state is in the language of the automaton. The states and transitions are labeled over the same alphabet as the MSC. To model check the MSC, the system determines whether there is an execution in the intersection between the language of the test automaton and the language of the specification automaton.

MSC-graphs and HMSCs can also be model checked according to the principles of the invention. An MSC-graph is a directed graph having nodes and edges. Each node references an MSC and the edges connect the nodes. Where a path through the graph passes through multiple nodes, the MSCs can be concatenated to form an extended MSC. In an HMSC, the nodes represent a simple MSC or another MSC-graph or HMSC. To model check an MSC-graph or an HMSC, it is first determined whether the intended meaning of the MSC-graph or HMSC is synchronous or asynchronous. In a synchronous MSC-graph or HMSC, every event in a node's referenced MSC occurs before any event occurs in the MSC referenced by the node's successor. If they are asynchronous, no constraint is placed on the timing of events based upon the referencing node's location in the graph or in the HMSC.

To model check synchronous MSC-graphs and HMSCs, they are converted directly to automata. These automata are checked with respect to the specification automaton. In the asynchronous case, model-checking proceeds on bounded MSC-graphs and HMSCs; therefore, asynchronous MSC-graphs and HMSCs are checked for boundedness prior to constructing the automata. They are considered bounded if no process in any cycle sends messages but does not receive a message, directly or indirectly, from any other process in the cycle. Any path in the graph that can repeat without terminating is a cycle. If an MSC-graph or HMSC is unbounded, some set of processes will be a witness to the unboundedness. These processes will send messages to at least one process outside of the set, but no process will receive messages from outside the set.

BRIEF DESCRIPTION OF THE DRAWINGS

A more complete understanding of the invention may be obtained from consideration of the following description in conjunction with the drawings in which.

DETAILED DESCRIPTION

An exemplary method according to the principles of the invention provides for model checking of message flow diagrams such as message sequence charts (MSCs), MSC-graphs, and hierarchical message sequence charts (HMSCs). To check that a message flow diagram satisfies a property, the individual events specified in the message flow diagram are labeled with symbols from an alphabet and the executions of the system are expressed as strings over the alphabet. These strings (words) are known as the language of the message flow diagram. An automaton (test automaton) operable to recognize these executions (strings) is constructed from the message flow diagram. A second automaton describes the property under test and is labeled over the same alphabet. Its language consists of the property's undesirable behaviors (specification automaton). Model checking corresponds to checking if the language of the test automaton intersects with the language of the specification automaton. Any intersection is a counterexample of the checked property, while an absence of an intersection indicates that the checked property is satisfied.

A. Message Sequence Charts, MSC-graphs and Hierarchical MSCs

Figure 1:
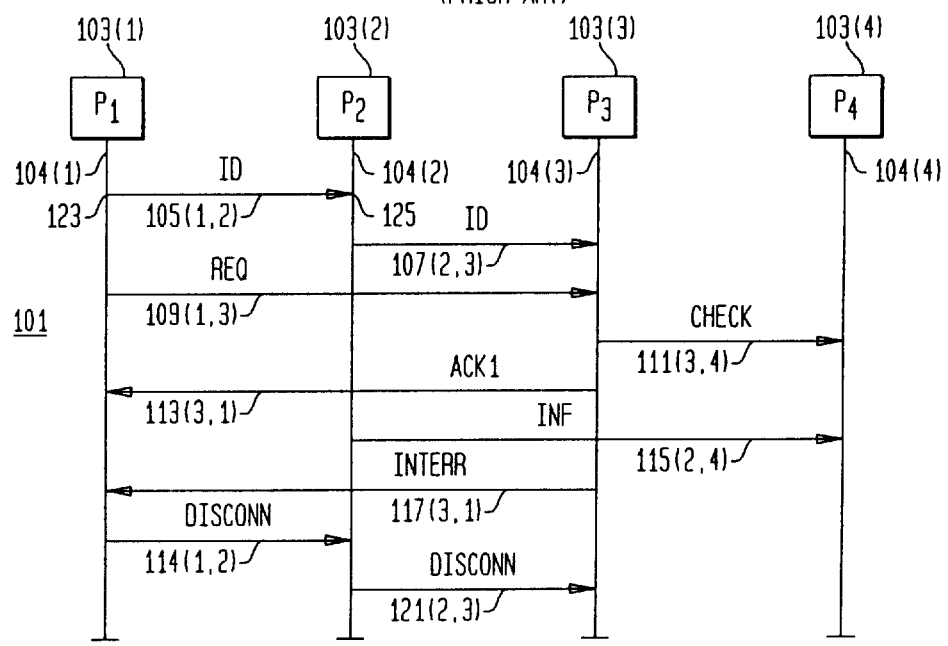
FIG. 1 shows an exemplary message sequence chart.

An exemplary MSC is shown in FIG. 1. This basic MSC specifies a finite set of process threads and defines a finite sequence of events for each process thread. Send and receive events are defined in pairs, with the two events assigned to different process threads. FIG. 1 shows a typical MSC 101 of a system made up of four concurrently operating processes $p_1$ 103(1) through $p_4$ 103(4). Each of the processes is represented in the chart by a vertical line 104. 104(1) represents $p_1$, 104(2) represents $p_2$ and so forth.

The processes 103(1 . . . 4) of MSC 101 coordinate their operations by means of messages. An arrow, for example, arrow 105, represents each message. Arrow 105 represents a message of the Id type, which is sent from process 103(1) to process 103(2). Source and destination are indicated in FIG. 1 by the tail and head of the arrow and in the reference number for the message by the pair of numbers in parentheses following the reference number. Arrows can be drawn either horizontally or sloping downwards, but not upwards. Each arrow is labeled with a message identifier. For the present discussion, the types of the messages are not important; it is sufficient merely that processes 103(1 . . . 4) interact with each other by means of messages 105 through 121.

When a message is sent, a send event occurs, and when it is received, a receive event occurs. A send event is indicated in the MSC by the point at which the arrow represented by the message leaves the sending process and a receive event is indicated by the point at which the arrow represented by the message strikes the receiving process. In FIG. 1 and with particular reference to message 105(1,3), a send event is shown at 123 and a receive event at 125. Logical and temporal relationships between MSC events can be expressed by means of event pairs. For example, event 123 is the causal predecessor of event 125, and that relationship can be expressed by the event pair (123,125). Such an MSC specifies a partial ordering of events, since send-receive arrows cannot go upwards in a chart.

Figure 2:
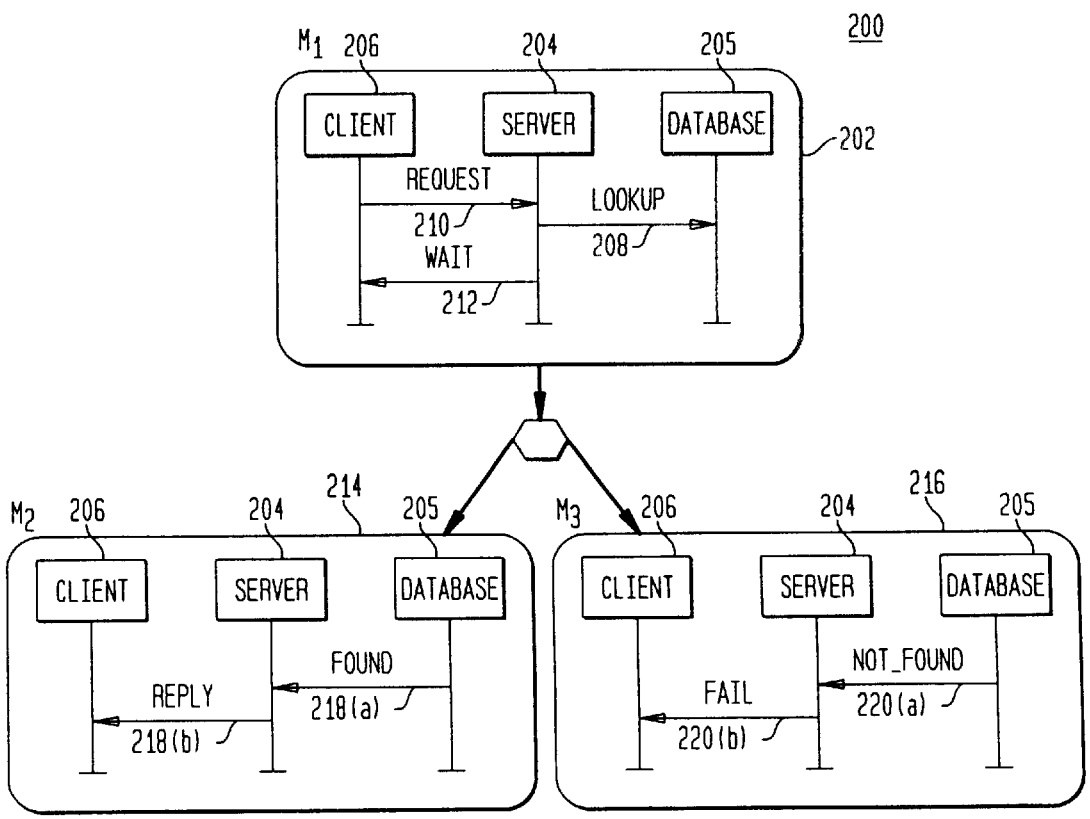
FIG. 2 shows an exemplary MSC-graph.

An MSC-graph is a graph having nodes referencing MSCs and edges corresponding to a concatenation of the referenced MSCs. A sample MSC-graph 200 is depicted in FIG. 2. The first node 202 references an MSC 210, $M_1$, depicting a scenario in which a server 204 initiates a database 205 lookup 208 in response to a client 206 request 210. The server 204 sends a wait message 212 during the lookup. The scenario of $M_1$ is followed by either the scenario 214 of $M_2$ or by the scenario 216 of $M_3$. The scenario of $M_2$ corresponds to a positive response (218a and 218b) from the database 205 and server 204, while the scenario 216 of $M_3$ models a negative response (220a and 220b) from the database and server. The hexagonal box 202 is a condition, and is used to indicate a choice or branching in the MSC-graph 200.

In any MSC-graph, paths that start at the initial node, or vertex, and end at the terminal node represent the finite executions of the system modeled by the MSC-graph, while all the infinite paths starting at the initial node represent infinite executions (not shown). Such infinite executions traverse as loops, known as cycles, in the graph.

Figure 3:
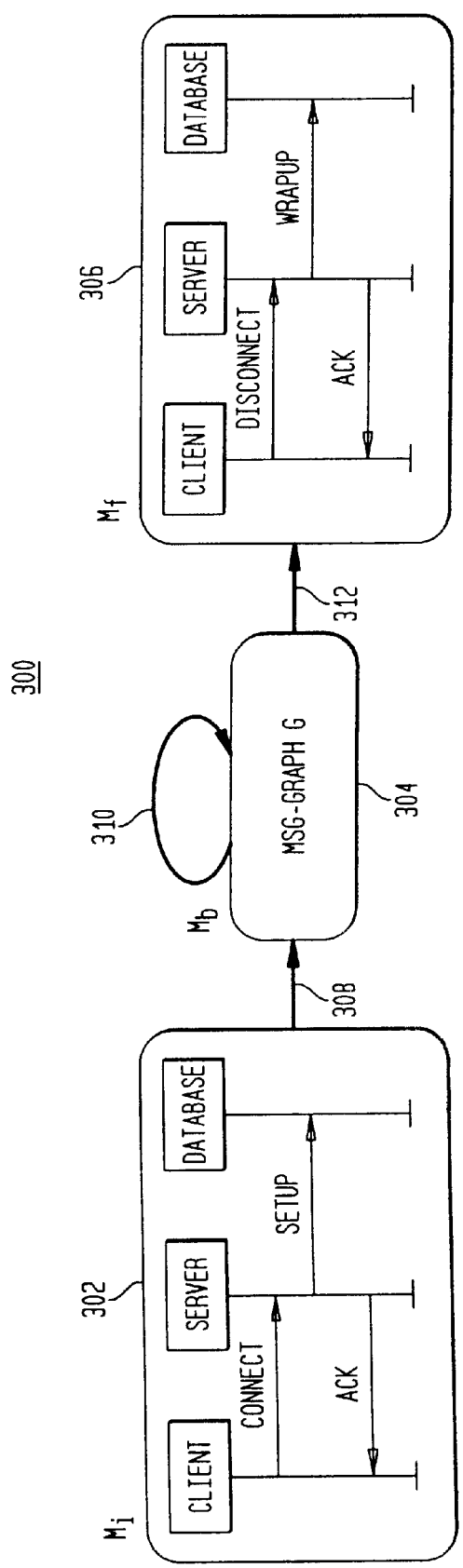
FIG. 3 shows an exemplary HMSC.

An HMSC is a more general formalism for modeling a system or system feature. The nodes in an HMSC may, but need not, reference a nested graph (which is another HMSC) or an MSC. For any HMSC, the total number of MSCs and subgraphs is finite, and no node in a subgraph refers to an HMSC above it in the nesting hierarchy. Referring to FIG. 3, an HMSC 300 for a hypothetical system feature is shown. Each node (302, 304 and 306) references an MSC or another graph. The nodes in the HMSC are connected by edges (308, 310 and 312), depicted by arrows, and a path through the HMSC is a set of nodes and edges. The HMSC 300 of FIG. 3 has three nodes $M_i$ (302), $M_b$ (304), and $M_f$ (306). The nodes $M_i$ and $M_f$ reference MSCs, as in an MSC-graph, and the node $M_b$ references another MSC-graph, G (for example, the graph of FIG. 2). This HMSC 300 can be flattened (i.e., its hierarchy removed) to create an MSC-graph. Flattening hierarchical graphs is explained in Alur and Yannakakis, *Model Checking of Hierarchical State Machines*, Proceedings of the Sixth ACM Symposium on Foundations of Software Engineering, 1998, at 175 to 188, which is incorporated herein by reference.

B. Automata Based Model Checking

Automata are finite state machines that can execute or recognize a linear sequence of events. They are formally defined by a set of states, a subset of initial states, a subset of accepting states, a finite set of inputs (an alphabet), and a transition relation that maps for each letter of the alphabet (input) each state to a set of next states. The state of an automaton depends upon its previous state and the input that triggers a state transition. Where a finite sequence of inputs terminates in an accepting state, the automaton recognizes the execution. For an infinite execution, the automaton recognizes the execution if the automaton generates an accepting state infinite times in the execution.

Figure 4:
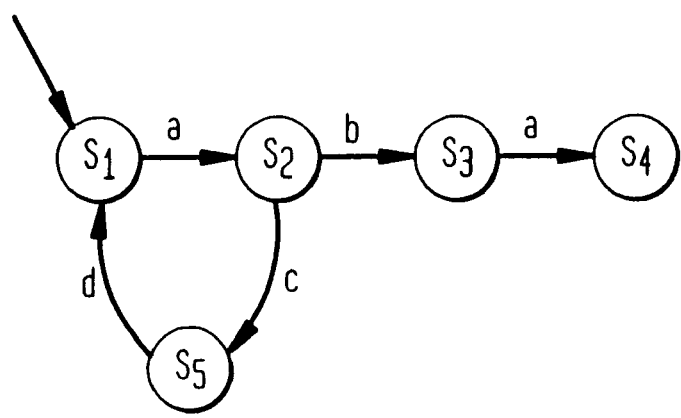
FIG. 4 shows an exemplary automaton.

An exemplary automaton is shown in FIG. 4. The automaton 400 consists of five states ($S_1 \ldots S_5$) and state transition relations a,b,c, and d. The sequence acdacd . . . represents an infinite execution because it can continue without terminating. If any of the states $S_1$ $S_2$ or $S_5$ are an accepting state, this infinite sequence is accepting. The symbols a,b,c, and d are the alphabet of the automaton 400. A sequence such as aba is a word and the words denoting all the possible sequences comprise the language of the automaton 400. A finite input sequence is accepting if there is an execution labeled by the sequence that terminates in an accepting state. For example, if $S_4$ is an accepting state, the sequence aba is an accepting finite sequence.

One automaton useful in model checking is a Büchi automaton. Formally, a Büchi automaton is a quintuple (S, $S_O$, $\Sigma$, $\delta$, F), where S is a finite set of states, $S_O \subseteq S$ are the initial states, $\Sigma$ is the finite alphabet, $\delta \subseteq S \times \Sigma \times S$ is the transition relation, and $F \subseteq S$ are the accepting states. A run over a word ($a_1 a_2 \ldots \in \Sigma$) is an infinite sequence of states ($s_1, s_2, s_3$, with $s_1 \in S_O$). A run is accepting if at least one accepting state occurs in the run infinitely many times. A word is accepted by a Büchi automaton exactly when there exists a run accepting the word. The language of a Büchi automaton is the set of words that the automaton accepts. The use of Büchi automata in model checking is further discussed in *An Automata-Theoretic Approach To Automatic Program Verification* (Preliminary Report), IEEE, 1986, and Büchi, *On a decision method in restricted second order arithmetic*, Proceedings of International Congress on Logic, Methodology and Philosophy of Science, Palo Alto, Calif., 1960 at 1–11.

In automata based model checking, the property of interest is given as, or translated into, a finite automaton (the property automaton). The system under test is also represented as an automaton (the test automaton). The complement of the property automaton (the specification automaton) represents the disallowed computations. To determine whether the system satisfies the property of interest, the specification automaton is intersected with the test automaton. Any sequence in the intersection is a counterexample of the checked property while the absence of an intersection verifies the checked property. Automata based model checking is further explained in Kurshan, *Computer-Aided Verification of Coordinating Processes: The Automata-Theoretic Approach,* Princeton Univ. Press, 1995.

C. Model Checking MSCs

Figure 5:
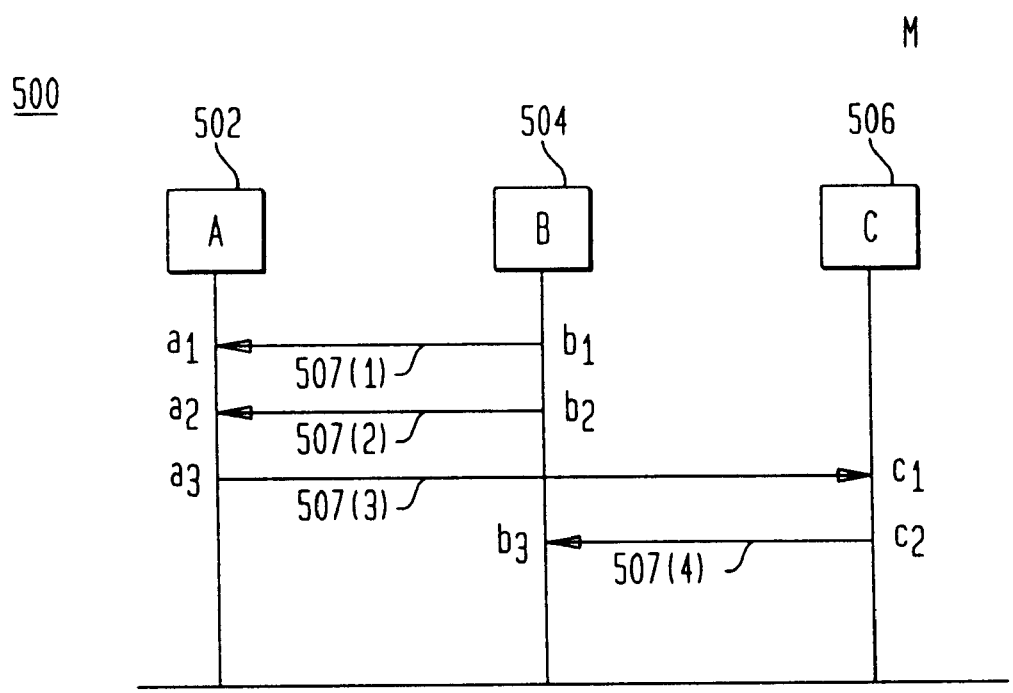
FIG. 5 shows an exemplary MSC having events labeled according to the principles of the invention.

To model check an MSC according to the principles of the invention, the MSC is represented as an automaton. One exemplary method for making such a representation includes labeling each event in the MSC with symbols from an alphabet. The MSC is then defined as a pair (M,l), where M is the MSC and l is a function mapping each event in the MSC to the alphabet. FIG. 5 shows a labeled MSC 500 with processes A (302), B (504) and C (506), four message arrows 507(1 . . . 4), and events $a_1$, $a_2$, $a_3$, $b_1$, $b_2$, $b_3$, $c_1$ and $c_2$. The MSC 500 specifies a partial ordering of these events. Possible linearizations of this partial order are mapped to strings over the alphabet by replacing each event by its associated symbol. The resulting set of strings is called the language of the MSC 500. The language of the MSC 500 represents the possible executions of the system. For the MSC 500, one possible linearization (ordering of events) is $b_1$ $b_2$ $a_1$ $a_2$ $a_3$ $c_1$ $c_2$ $b_3$.

Figure 6A:
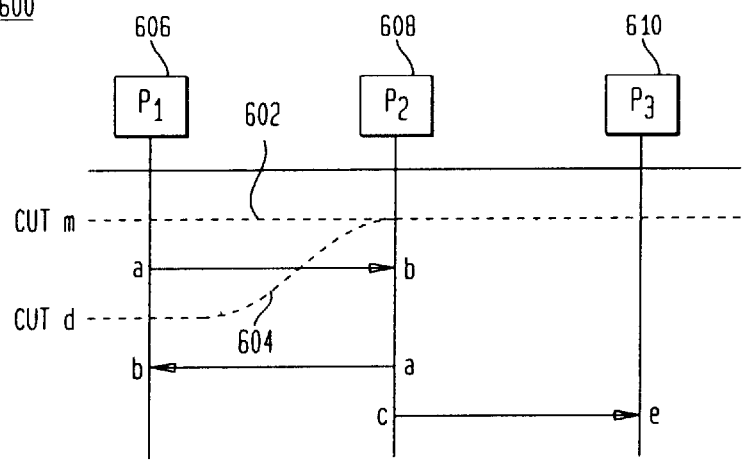
FIG. 6 shows an exemplary MSC having cuts according to the principles of the invention.
Figure 6B:
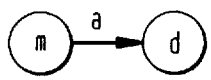

A test automaton that accepts the language of the MSC is constructed by extracting the global states from the partial order of events specified by the MSC. FIGS. 6A and 6B illustrate an exemplary method for constructing an automaton from an MSC. The MSC 600 of FIG. 6A depicts three processes: $P_1$ (606), $P_2$ (608) and $P_3$ (610). $P_1$ (606) includes a send event labeled a and a receive event labeled b. $P_2$ (608) has one receive event, b, and two send events, a and c. $P_3$ (610) includes one receive event, e. For illustration purposes, the MSC 600 shows two cuts. A dashed line 602 designates cut m and a dashed line 604 designates cut d. A cut is a subset of events in an MSC that is closed with respect to the partial ordering of events. Since all the events of a single process are linearly ordered, a cut can be specified by the final event of each process in the cut.

FIG. 6B illustrates a partial automaton 620 constructed from the cut m and the cut d of the MSC 600. For the partial automaton 620 of FIG. 6B, the global state represented by cut m becomes state m in the automaton 620. The global state represented by cut d becomes state d in the automaton. The transition from the global state of cut m to the global state of cut d occurs over the single send event a. In the partial automaton 620, state m transitions to state d over the edge labeled a. A complete test automaton is constructed by taking the cuts from the initial cut to the final cut, one event at a time. The states of the complete test automaton correspond to all the cuts of the MSC. The empty cut is the initial state, and the cut with all the events executed is the final state. Other cuts are chosen such that the global states of the MSC are represented by a cut. If one cut equals another cut plus a single event, then the automaton has an edge from the first cut to the second cut over the symbol for the event.

To model check, the undesired behavior is represented by a specification automaton constructed over the same alphabet as the MSC. Requirements may be translated directly into the specification automaton or the complement can be taken of an automaton that accepts the desired executions of the system. The system modeled by an MSC satisfies the specified properties if the language of the test automaton does not intersect the language of the specification automaton. To check for the intersection, the automata are combined and, from the combination, it is determined whether there exists an accepting state in both automata that is reachable over a common path from at least one initial state in both automata.

D. Model Checking MSC-graphs

Figure 7A:
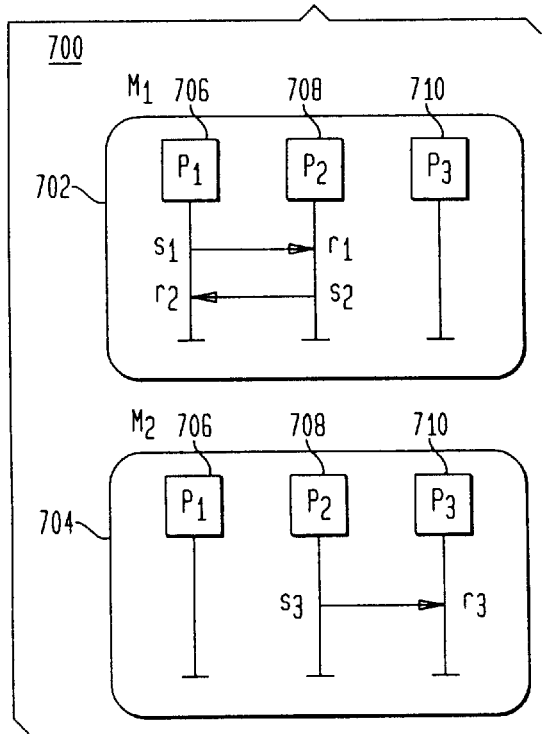
FIGS. 7A, 7B and 7C show exemplary synchronous and asynchronous concatenations according to the principles of the invention.
Figure 7B:
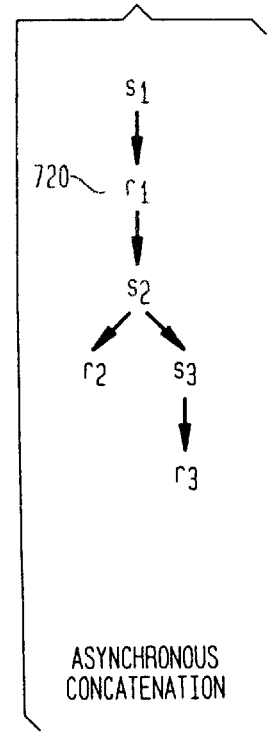
Figure 7C:
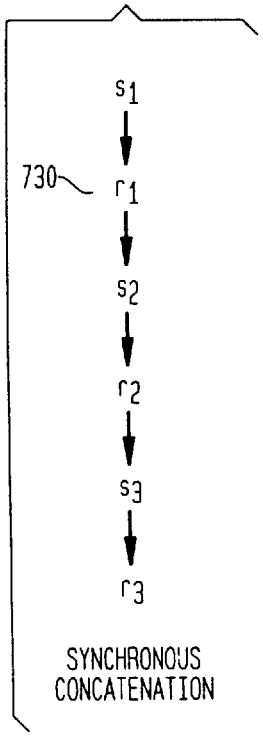

Model checking MSC-graphs requires concatenation of the MSCs referenced by the nodes in the paths of interest in the graph. The MSCs in a path are concatenated either synchronously or asynchronously. Referring to FIGS. 7A, 7B and 7C, an MSC-graph 700 having two MSCs, 702 and 704, are shown. The MSCs have processes P1(706), P2(708) and P3(710). The MSC 702 represents the ordering of events $s_1 r_1 s_2 r_2$. The second MSC 704 represents the ordering $s_3 r_3$. The asynchronous interpretation of these MSCs corresponds to concatenating the MSCs process by process. As shown in FIG. 7B, in an asynchronous concatenation 720, after event $s_2$, there is no constraint on the ordering of events $r_2$ or $s_3 r_3$. In other words, whether $r_2$ occurs prior to $s_3$ or $r_3$ is undetermined. In a synchronous interpretation 730, however, the events in the first MSC 702 are constrained by the requirement that all events in the first MSC 702 occur prior to any event in the second MSC 704. This results in the ordering of events 730 ($s_1 r_1 s_2 r_2 s_3 r_3$) as shown in FIG. 7C.

1. Model Checking with Synchronous Concatenation

Figure 8:
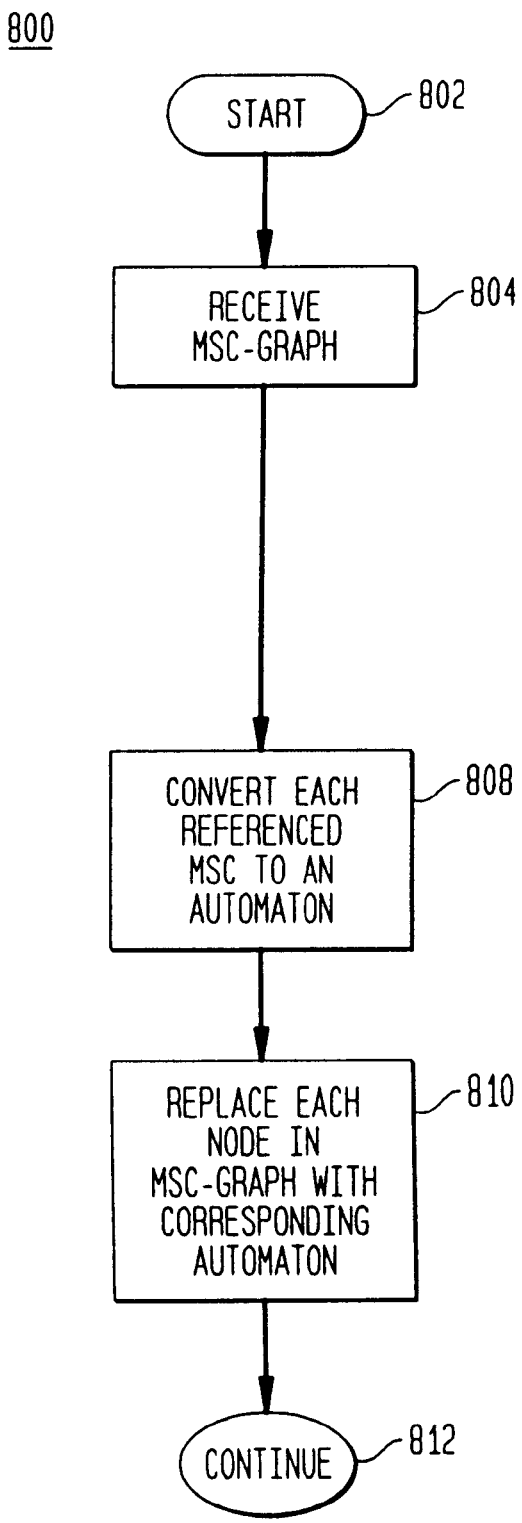
FIG. 8 is a flowchart for translating a synchronous MSC-graph to an automaton according to the principles of the invention.

To model check a synchronous MSC-graph, an automaton accepting the language of the graph is constructed as shown in the flowchart 800 of FIG. 8. Process flow starts at a start node 802. The MSC-graph is received in an input step 804. Each MSC referenced by a node is converted to an automaton, as at 808. To convert the MSCs, the global states are extracted using cuts, as previously explained with reference to FIGS. 6A and 6B. The automaton corresponding to the MSC of the node replaces each node of the MSC-graph, as at 810. Each edge of the MSC-graph is replaced by epsilon transitions from the accepting states of the automaton corresponding to the head of the edge to the initial states of the automaton corresponding to the tail of the edge. In other words, each accepting state in a given automaton precedes an initial state in a successor automaton. Concatenation of automata is explained in, for example, Hopcroft and Ullman, *Introduction to Automata Theory, Language and Computation,* Addison-Wesley. Model checking is completed as for a simple MSC: it is determined whether the language of the concatenated automaton intersects with a specification automaton.

2. Model Checking with Asynchronous Concatenation

Model checking in the asynchronous case includes determining whether the graph is bounded and, if so, constructing an automaton representing the MSC-graph. In general, an MSC graph is bounded if for every cycle of the MSC graph, all active processes communicate directly or indirectly in both directions (send and receive) with each other. A graph is unbounded, for example, if any process in a cycle can send an infinite number of messages without receiving any message. It is also unbounded if there is a cycle in the graph where some process sends a message at some node but does not receive a message at any node in the cycle. Boundedness for an MSC-graph is discussed in Alur and Yannakakis, *Model Checking of Message Sequence Charts,* Proceedings of the Tenth International Conference on Concurrency Theory, Springer Verlag, August 1999, which is incorporated herein by reference.

To determine boundedness according to the method of the invention, it is determined whether any process is a witness to unboundedness. For an MSC-graph with a process set P (all processes in the MSC are members of P), a subset of processes Q is a witness for unboundedness if there exists a cycle such that in the cycle's concatenated MSC, no process in Q sends a message to a process not in Q, and there is an active process that is a member of Q and an active process that is not a member of Q.

Figure 9:
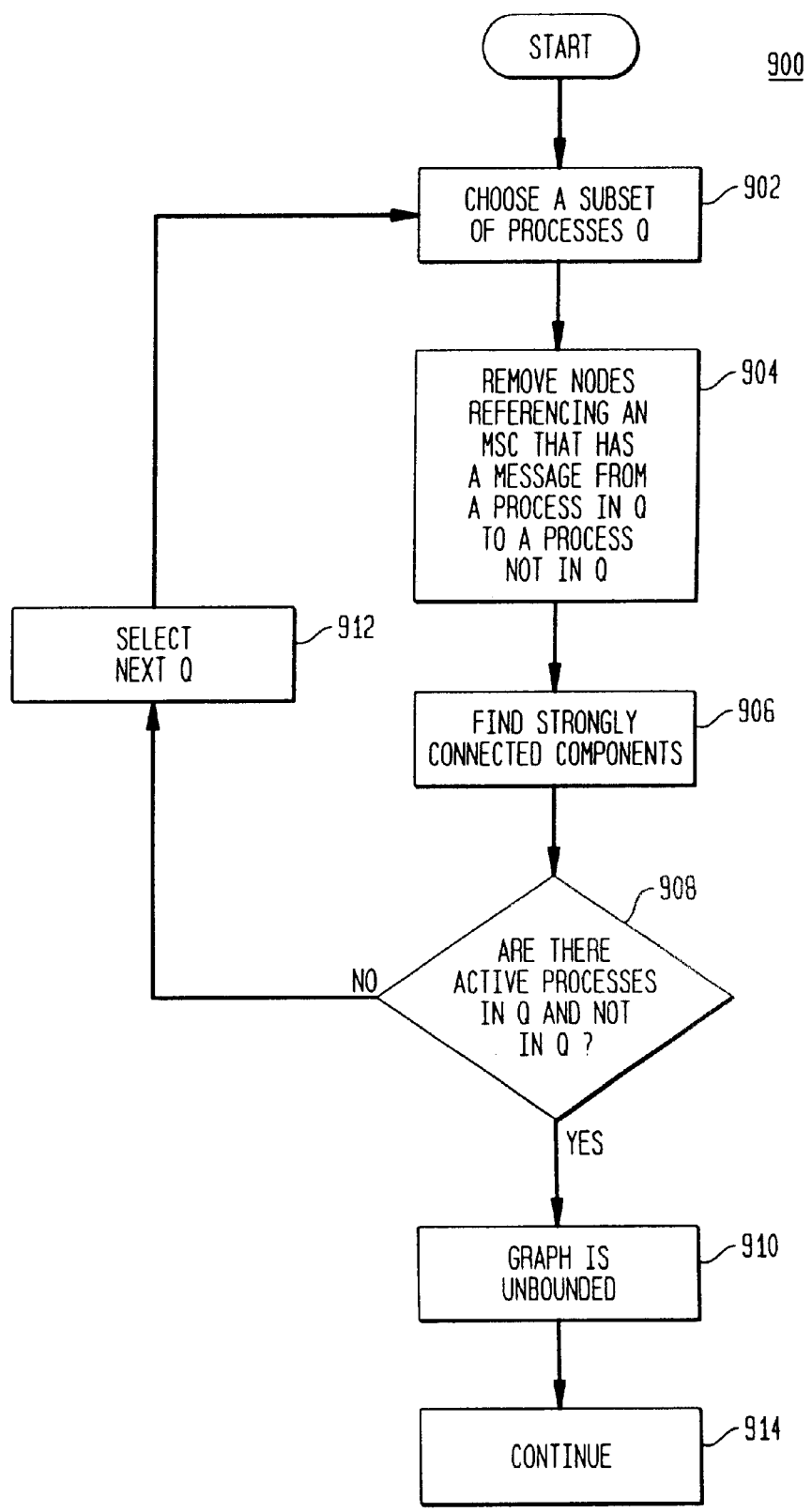
FIG. 9 is a flowchart for determining boundedness of an MSC-graph according to the principles of the invention.

An exemplary method for determining whether a given subset of processes is a witness for unboundedness is shown in FIG. 9. In the flowchart 900, a subset of processes Q is chosen to determine whether they are witnesses to unboundedness, as at 902. Nodes in the graph are removed in a process step 904, if the node's referenced MSC has some process in Q that sends a message to some process not in Q. This results in a modified graph, G.

The strongly connected components of G are then found in a process step 906. As is known in the art, strongly connected components have cycles that do not traverse to other parts of the graph. Identifying strongly connected components in a graph is explained in Aho, Hopcraft, Ullman, *The Design and Analysis of Algorithms,* Addison-Wesley, 1974. A decision step 908 determines whether for some strong component of G, the corresponding set of active processes have members in Q and members outside of Q. If so, the processes in Q are witnesses for unboundedness, and G is reported as unbounded in a reporting step 910. If there is no unboundedness, another set Q is chosen, as at 912, and the procedure continues, as at 914, until all Qs are checked.

As more fully explained hereafter, to model check a bounded MSC-graph according to the principles of the invention, an automaton that generates the asynchronous language of the graph is constructed. Each state of the automaton records certain information called a configuration. The automaton is constructed from legal configurations extracted from the MSC-graph.

A legal configuration consists of three components (pieces of information). The first components is a sequence of not necessarily distinct and not necessarily all nodes in a path of the MSC-graph, such that no node occurs more than the number of processes. The sequence is chosen such that for some linearization of the path's MSC and for some point in time, the sequence consists of all present nodes, past nodes that are adjacent to future nodes and the last node in the path. Present nodes are nodes having some events executed before and after the point in time. Past nodes have all events executed prior to the point in time, and future nodes have all events executed after the point in time. The second component of a configuration is a mapping from each process to the node in the sequence that contains the last step executed by the process and to a position in its process line. If the node containing the last step of the process is not in the sequence, then the process is mapped to the earliest subsequent node in the sequence. The configuration also defines for every node in the sequence a bit corresponding to each node and its immediate successor in the sequence. The bit is high is there is a subpath between the node and its successor, which contains future nodes, and low if it does not.

For purposes of constructing an automaton operable to generate the language of the MSC-graph, legal configurations are chosen for the states of the automaton. A legal configuration from a partial ordering of events satisfies the following condition: The mapping of the processes in the second component of a configuration induces a cut of the MSC. In other words, if a node in the sequence contains a message from a first process to a second process, and the first process is mapped before or at the selected node prior to the sending of the message, then the second process is mapped before or at the selected node prior to the reception of the message.

Figure 10:
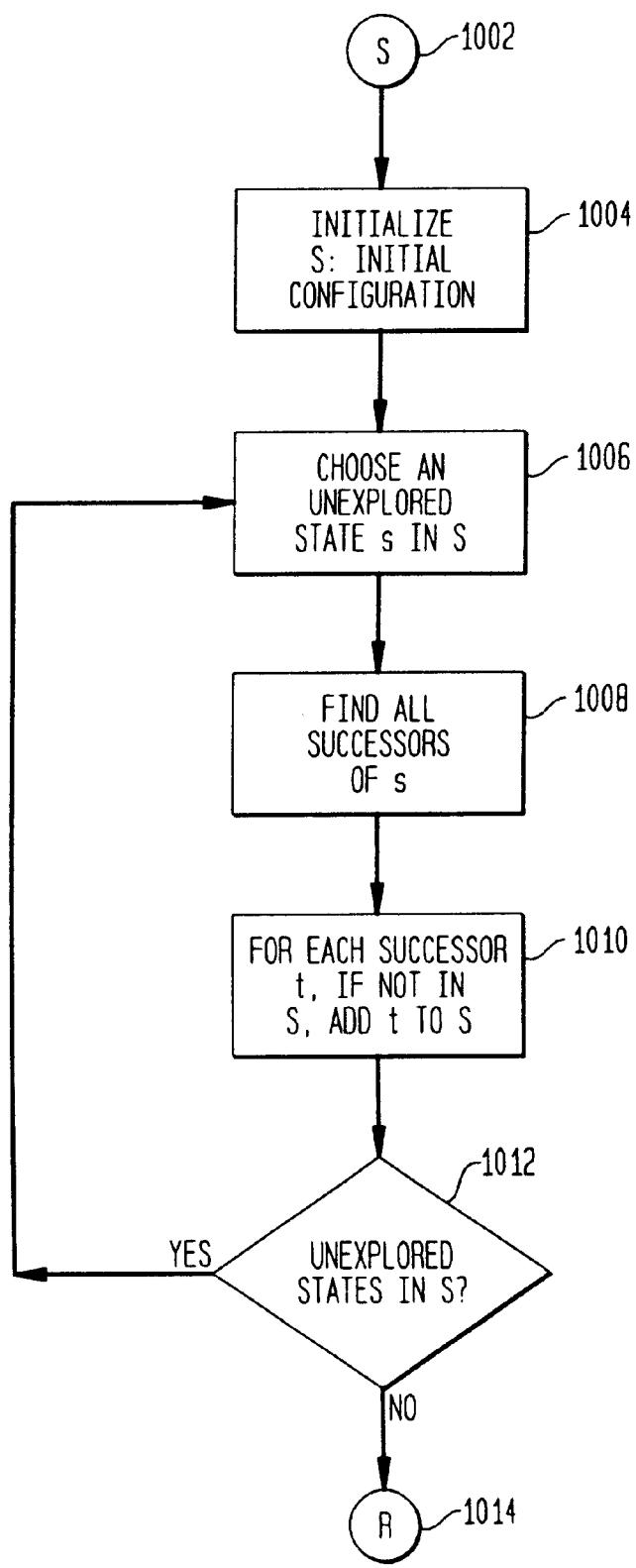
FIG. 10 is a flowchart for converting an asynchronous MSC-graph to an automaton according to the principles of the invention; and, FIG. 11 is an exemplary system according to the principles of the invention.

An exemplary process for generating legal configurations from an MSC-graph is illustrated in the flowchart 1000 of FIG. 10. The process proceeds from the start node 1002 to an initialization process step 1004. In this step 1004, a data structure S is initialized to contain the initial configuration. The initial configuration is the configuration with all processes mapped to the initial node and to the beginning of their process lines. In a process step 1006, an unexplored state, s, is chosen from S. An unexplored state is any state that may be a successor state from the current state. All successor states are then found in a process step 1008. Each successor state, t that is not in S is added to S along with its transition, as at 1010. A decision step 1012 determines whether any unexplored states remain in S. If so, process control returns to the selection step 1006; otherwise, process control proceeds to a return node 1014.

The process for determining successor states to s depends upon whether any process, p, in s is mapped to a node, u, with unfinished events. In such a case, it is determined whether the next event for p is enabled. If it is, the mapping for the process p is updated and it is determined whether any events in u remain. If none remain, the node u is removed and the bits are updated. If no events in p are enabled, there are no successors for this case. The pseudo code for this process is given below.

```
input s mapped to node u
  for each p of s do:
    if next event of p is labeled a and event is enabled
      update mapping for p
        if all events in u are finished, delete u and update
          bits
    else no successor possible
```

In this pseudo code segment, s is the current state of the configuration and p represents the processes in the state. Event labels are referred to as a and u designates a node in a sequence.

In a second case, p is mapped to a node where all the events in p are finished. In this case, the mapping of p is updated to a node v such that along the path from u to v process p is inactive at all the nodes. Furthermore, if the corresponding bit for u is high (the subpath contains future nodes), for each node w along the path, a path is constructed from w to the next node of the sequence such that p as well as any other process mapped after w are inactive at all nodes along this path (p can reach the next node in the sequence by a path that does not use any process mapped later in the sequence). Process p is thereby mapped to its first event in node v and processing proceeds as in the previous case.

Legal configurations are generated for all accepting paths in the graph. These legal configurations are generated without enumerating explicitly all the paths of the MSC graph, (which can be infinite, whereas there are a finite number of legal configurations). Rather, the legal configurations (and the test automaton) are generated incrementally, starting from the initial configuration and following transitions corresponding to execution of individual steps of the processes. These legal configurations in addition to the configurations from the initial node and the terminal node are the states of the test automaton.

E. Model Checking HMSCs

Model checking HMSCs proceeds from the model checking of MSCs and MSC-graphs. In one exemplary approach, the HMSC can be flattened using known methods and the resulting MSC-graph can be model checked utilizing the above methods. Alternatively, it is determined whether the HMSC is synchronous or asynchronous. In synchronous model checking for HMSCs, the graph is labeled from an alphabet and a specification automaton over the alphabet is constructed. The graph is translated into a hierarchical state machine (hierarchical Kripke structure) by replacing each unnested node in the graph (i.e., node that refers to an MSC and not to another graph) by an automaton describing the linearizations of the underlying MSC. The edges in the graph are replaced by edges that ensure concatenation of the languages of the resulting automata. The resulting hierarchical automaton captures the HMSC's language and model checking of the HMSC reduces to model checking of the hierarchical automaton with respect to the specification automaton. The hierarchical automaton can be flattened and model checked or, alternatively, it can be checked directly. Direct model checking of hierarchical structures is explained in Alur and Yannakakis, *Model Checking of Hierarchical State Machines,* Proceedings of the Sixth ACM Symposium on Foundations of Software Engineering, 1998, at 175 to 188, which is incorporated herein by reference.

In the asynchronous case, the HMSC is first checked for boundedness. The HMSC can be flattened and checked for boundedness using the methods applied to MSC-graphs. More efficiently, the HMSC is treated as a hierarchical state machine and it is model checked against a property automaton having boundedness as its property. Model checking of Hierarchical State Machines is described in the above reference. If the HMSC is bounded, an automaton is constructed for the flattened HMSC, as previously explained.

F. Architecture of an Exemplary System

Figure 11:
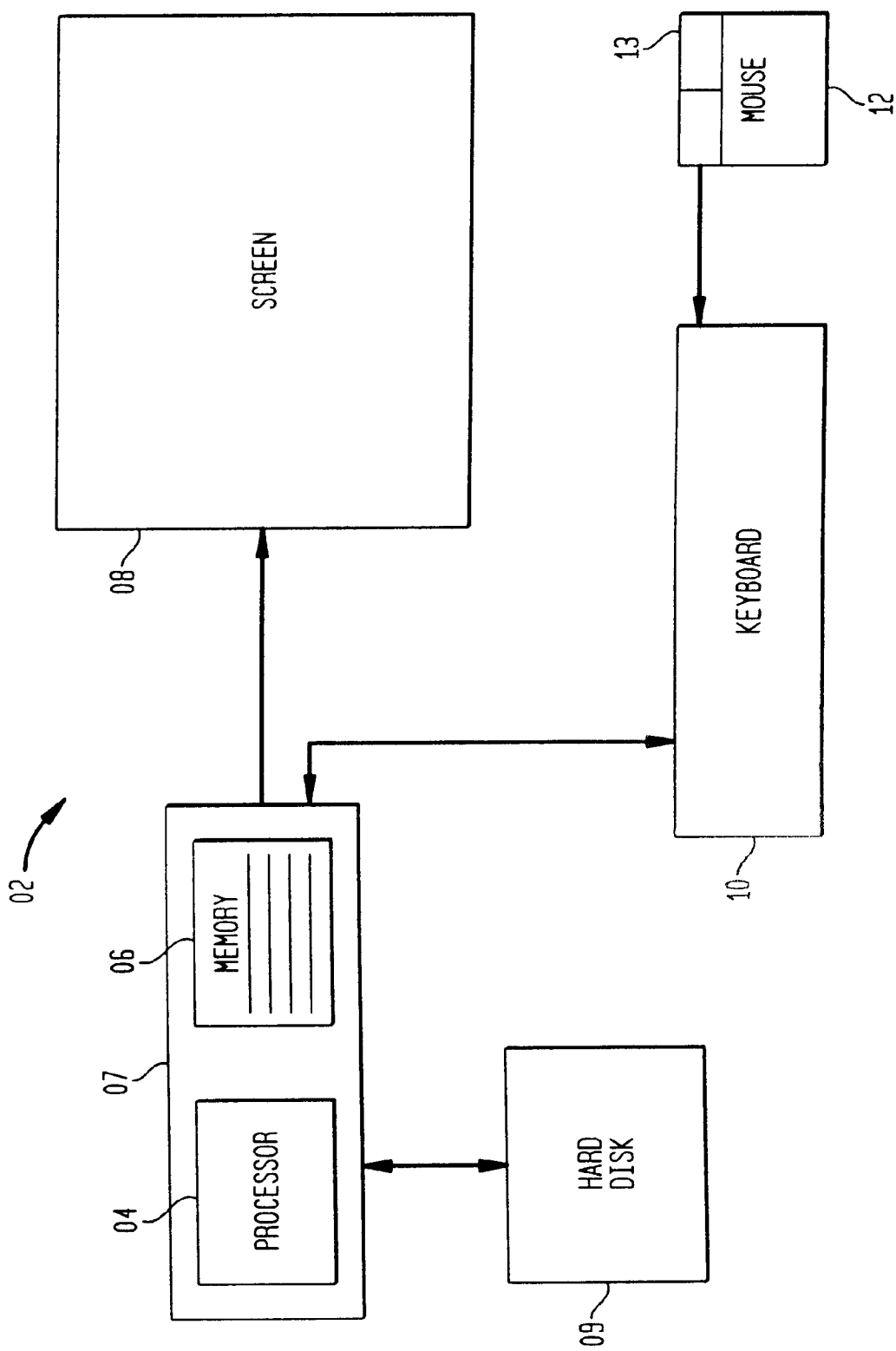

FIG. 11 illustrates an exemplary embodiment of a computer-based system 02 for carrying out the method of the invention. The system 02 comprises a processing unit 07, a display screen terminal 08, input devices, e.g., a keyboard 10, and storage devices, such as a hard disk 09. The processing unit 07 includes a processor 04 and a memory 06. The memory 06 includes areas for storing, among other things, instructions for the processor 04. A selection device 12 is operable to select objects displayed on the display 08 when the system 02 operates with a graphical user interface (GUI). The screen 08, keyboard 10 and selection device 12 are collectively known as user interface devices. The system 02 utilizes a computer operating system and a windowing system for providing an interface between the user and the GUI. The operating system and the windowing system can be found resident in the memory 06.

Processor 04 is a general-purpose processor capable of executing a stored program routine that implements the model checking method described herein. Memory 06 can consist of a single memory chip or multiple banks of memory, and the memory 06 can include Read Only Memory (ROM) and Random Access Memory (RAM). The storage device 09 is capable of storing and transmitting data and can consist of multiple storage units that are linked together. The storage device 09 may store, among other things, message flow diagram representations, automata representations and the output results produced by the method of the invention. The representations contain the information necessary for the system 02 to display, for instance, a message flow diagram or an automata image on the system's 02 display terminal 08. These representations can also be kept in memory 06 and moved to storage 09. Representations and output results stored in the storage unit 09 are transmitted to processor unit 04 through an I/O bus (not shown).

When implemented as a set of instructions for the processor 04, the system architecture includes a converter for converting message flow diagrams to test automata and a model checker for verifying that the test automata satisfies some property. When the model checker implements automata based model checking, it includes a combiner for combining a specification automaton and a test automaton and a resolver for solving a reachability problem for the resulting automaton according to the method of the invention. The model checker is operable to provide an output indicating whether the message flow diagram satisfies the property of interest.

As detailed above, the invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be apparent to one of ordinary skill in the art that model checking of message flow diagrams, such as MSCs, is useful in may aspects of systems design and analysis. In addition to checking behavioral requirements early in the development cycle, MSCs can be constructed for existing systems or models and the MSCs can be checked against the properties of interest using the foregoing methods. An MSC can be constructed by actively simulating the system or by passively observing the message exchanges and recording the message exchanges between processes. Advantageously, the method of the invention verifies the observed ordering of events for the MSC and the possible alternative orderings of events. In this way, a class of executions can be checked at the same time, rather than model checking a single execution or scenario.

What is claimed:

1. A method for verifying a message flow diagram (MFD) against a property described by a specification automaton, comprising the steps of:
   constructing a test automaton from said MFD if said MFD is a message sequence chart (MSC) or a synchronous MFD;
   constructing said test automaton from said MFD if said MFD is an asynchronous MFD and is bounded, said MFD being bounded when, for every cycle of said MFD, all active processes represented by said MFD communicate directly or indirectly in both directions with each other; and,
   determining an intersection of said test automaton with respect to said specification automaton.

2. The method of claim 1 wherein the specification automaton exhibits undesirable behavior.

3. The method of claim 1 wherein the message flow diagram is one selected from the group consisting of message sequence charts, message sequence chart graphs and hierarchical message sequence charts.

4. The method of claim 1 wherein said constructing said test automaton includes:
   extracting a plurality of global states from said message flow diagram, said global states including an initial state and a final state;
   defining a plurality of states in said test automaton, each state corresponding to one of said global states in said message flow diagram; and,
   constructing a plurality of transitions, wherein said test automaton transitions from said initial state to said final state traversing said global states of said message flow diagram.

5. The method of claim 4 wherein the extracting step includes the further steps of:
   defining a plurality of cuts for the message flow diagram, each cut defining a subset of events in the message flow diagram; and,
   specifying a global state as a final event in each cut.

6. The method of claim 5 wherein the step of defining a plurality of transitions includes the steps of taking each cut from the initial state to the final state one event at a time and specifying a corresponding edge connecting the global states specified by each cut.

7. The method of claim 1 wherein said message flow diagram is an MSC-graph having nodes and edges, said nodes referencing a message sequence chart and said edges defining a plurality of paths, said constructing said test automaton further includes:
   converting said message sequence chart referenced by each of said nodes in at least one of said paths to a corresponding automaton; and,
   concatenating said corresponding automata.

8. The method of claim 1 wherein said MFD is a MSC-graph, said MFD being bounded when further includes:
   choosing a subset of processes represented by said MSC-graph;
   removing nodes having a referenced message sequence chart having a member in said subset of processes that sends a message to a process outside said subset, the removing step resulting in a modified MSC-graph;
   determining a plurality of strongly connected components in said modified MSC-graph; and,
   determining whether at least one of said strongly connected components have at least one active process being a member of said subset and at least one active process outside said subset.

9. The method of claim 8 wherein said constructing said test automaton includes generating a plurality of legal configurations for said MSC-graph, each of said legal configurations being a state of said test automaton.

10. The method of claim 1 wherein the message flow diagram is an HMSC, the steps further comprising the step of flattening the HMSC.

11. The method of claim 1 wherein the message flow diagram is a hierarchical message sequence chart (HMSC), said constructing said test automaton including:
   replacing nodes referencing a message sequence chart with an automaton describing linearizations of said message sequence chart; and,
   replacing edges in said HMSC with edges ensuring concatenation of said automata.

12. A method for designing systems comprising the steps of:
   documenting requirements in at least one message flow diagram (MFD); and,
   checking each of said at least one MFD for a property; including:
      converting said at least one MFD to a test automaton if said at least one MFD is a message sequence chart (MSC) or a synchronous MFD,
      converting said at least one MFD to said test automaton if said at least one MFD is an asynchronous MFD and is bounded, said at least one MFD being bounded when, for every cycle of said MFD, all active processes represented by said at least one MFD communicate directly or indirectly in both directions with each other, converting said property to a specification automaton, and determining an intersection between said test automaton and said specification automaton.

13. A system for checking a message flow diagram (MFD) for a property comprising;

a converter operable to convert said MFD to a test automaton if said MFD is a message sequence chart (MSC) or a synchronous MFD, convert said MFD to said test automaton if said MFD is an asynchronous MFD and is bounded, said MFD being bounded when, for every cycle of said MFD, all active processes represented by said MFD communicate directly or indirectly in both directions with each other, said converter further operable to convert said property to a specification automaton; and, a model checker operable to determine an intersection between said test automaton and said specification automaton.

14. The system of claim 13 wherein the model checker further includes:

a combiner for combining the test automaton and the specification automaton into a combined automaton; and, a resolver operable to determine an intersection between the test automaton and the specification automaton.

15. A machine-readable medium having stored thereon a plurality of instructions, the plurality of instructions including instructions that, when executed by a machine, cause the machine to perform a message flow diagram (MFD) property checking method comprising:

receiving a message flow diagram representation;

constructing a specification automaton representation from the property;

constructing a test automaton from the message flow diagram representation if the message flow diagram representation is a message sequence chart or a synchronous message flow diagram representation;

constructing the test automaton from the message flow diagram representation if the message flow diagram representation is an asynchronous message flow diagram representation and is bounded, the message flow diagram representation is bounded when, for every cycle of the message flow diagram representation, all active processes represented by the message flow diagram representation communicate directly or indirectly in both directions with each other; and determining an intersection of the test automaton representation and the specification automaton representation.

16. The machine readable medium of claim 15 wherein the message flow diagram representation is one selected from the group consisting of message sequence charts, message sequence chart graphs and hierarchical message sequence charts.

17. The machine readable medium of claim 15 wherein the instructions for converting the message flow diagram representation to the test automaton representation include instructions that, when executed by a machine, cause the machine to extract a plurality of global states from the message flow diagram representation, the global states including an initial state and a final state, to define a plurality of states in the test automaton representation, each state corresponding to a global state in the message flow diagram representation, and to construct a plurality of transitions wherein the test automaton representation transitions from the initial state to the final state traversing the global states of the message flow diagram representation.

18. The machine readable medium of claim 17 wherein the instructions for extracting the plurality of states from the message flow diagram representation include instructions that, when executed by a machine, cause the machine to define a plurality of cuts for the message flow diagram representation, each cut defining a subset of events in the message flow diagram representation and to specify a global state as a final event in each cut.

19. A method for model-checking requirements of a system having communicating processes, the steps comprising:

recording message exchanges among the processes;

constructing a message flow diagram (MFD) from the message exchanges;

constructing a test automaton from the MFD if the MFD is a message sequence chart or a synchronous MFD;

constructing the test automaton from the MFD if the MFD is an asynchronous MFD and is bounded, the MFD being bounded when, for every cycle of the MFD, all active processes represented by the MFD commnunicate directly or indirectly in both directions with each other; and, determining an intersection of the test automaton with respect to a specification automaton.

20. The method of claim 19 further including the step of simulating a system for revealing message exchanges of the system.

21. The method of claim 19 including the further step of observing the message exchanges for a system.

* * * * *